US011358608B2

(12) United States Patent
Damnjanovic et al.

(10) Patent No.: US 11,358,608 B2
(45) Date of Patent: Jun. 14, 2022

(54) METHOD AND SYSTEM FOR VEHICULAR COMMUNICATION AND SAFETY MONITORING OF DRIVING ENVIRONMENT TO PROVIDE EARLY WARNINGS IN REAL-TIME

(71) Applicant: The Texas A & M University System, College Station, TX (US)

(72) Inventors: Ivan Damnjanovic, College Station, TX (US); Alireza Talebpour, College Station, TX (US)

(73) Assignee: The Texas A&M University System, College Station, TX (US)

( * ) Notice: Subject to any disclaimer, the term of this patent is extended or adjusted under 35 U.S.C. 154(b) by 226 days.

(21) Appl. No.: 16/610,395

(22) PCT Filed: May 4, 2018

(86) PCT No.: PCT/US2018/031058
§ 371 (c)(1),
(2) Date: Nov. 1, 2019

(87) PCT Pub. No.: WO2018/208591
PCT Pub. Date: Nov. 15, 2018

(65) Prior Publication Data
US 2020/0290638 A1 Sep. 17, 2020

Related U.S. Application Data

(60) Provisional application No. 62/502,638, filed on May 6, 2017.

(51) Int. Cl.
*B60W 50/14* (2020.01)
*B60W 30/095* (2012.01)
(Continued)

(52) U.S. Cl.
CPC ........ *B60W 50/14* (2013.01); *B60W 30/0953* (2013.01); *B60W 30/0956* (2013.01);
(Continued)

(58) Field of Classification Search
None
See application file for complete search history.

(56) References Cited

U.S. PATENT DOCUMENTS 9,248,834 B1 2/2016 Ferguson et al.
10,452,068 B2 * 10/2019 Djuric ..................... G06N 3/04
(Continued)

OTHER PUBLICATIONS

Thomas, Shane, International Search Report for PCT/US18/31058, dated Jul. 23, 2018 (2 pages).

*Primary Examiner* — Todd Melton
(74) *Attorney, Agent, or Firm* — Winstead PC

(57) ABSTRACT

A vehicular warning system includes a plurality of input devices. A computing unit is electrically coupled to the input system. An input preprocessing classifies signals received from the plurality of input devices into Vehicle information, Roadway information, Traffic information, and eXogenous information ("VRT-X") data structure. The early warning processing unit observes the VRT-X signal provided by the input preprocessing unit corresponding to an environment surrounding a vehicle, predicts future changes in the environment over a dynamically-configured range, and determines signal properties in both time and frequency domain over a moving window. Based on defined early warning classification rules, the computing unit assigns a threat level to the VRT-X signal corresponding to the environment surrounding the vehicle. Responsive to the threat level being above a threshold, the computing unit interacts with the at least one vehicle control and communication device to provide early-warning risk-mitigation control.

20 Claims, 8 Drawing Sheets

(51) Int. Cl.
*G06K 9/62* (2022.01)
*G06V 20/56* (2022.01)
*H04W 4/40* (2018.01)
*B62D 15/02* (2006.01)

(52) U.S. Cl.
CPC ........... *B62D 15/025* (2013.01); *G06K 9/623* (2013.01); *G06V 20/588* (2022.01); *H04W 4/40* (2018.02); *B60W 2050/143* (2013.01); *B60W 2554/4041* (2020.02); *B60W 2554/4042* (2020.02)

(56) References Cited

U.S. PATENT DOCUMENTS

| | | |
|---|---|---|
| 2011/0128902 A1 | 6/2011 | Guo |
| 2016/0097851 A1 | 4/2016 | Zhang et al. |
| 2017/0010109 A1 | 1/2017 | Hayon et al. |

* cited by examiner

METHOD AND SYSTEM FOR VEHICULAR COMMUNICATION AND SAFETY MONITORING OF DRIVING ENVIRONMENT TO PROVIDE EARLY WARNINGS IN REAL-TIME

CROSS-REFERENCE TO RELATED APPLICATIONS

This application claims priority to, and incorporates by reference the entire disclosure of, U.S. Provisional Patent Application No. 62/502,638, filed on May 6, 2017.

BACKGROUND

Technical Field

The present disclosure relates to processing vehicular sensor and communication device data and providing output to control systems and more particularly, but not by way of limitation, use of computing systems to: structure vehicle-centered data about driving environment for communications; and provide early warnings of unadjusted speed, potentially dangerous vehicle trajectories, and other unsafe driving environment and conditions.

History of the Related Art

Safety of the traveling public is one of the major concerns of highway agencies and of society in general. As driving assistance systems, connected vehicles, and fully autonomous vehicles become more pervasive, new safety challenges arise. The current vehicular systems that perceive and/or respond to sensors' input require high computing power and rely on large data sets to train the algorithms for well-defined unsafe driving situations. Thus, the more crash and/or accident data that is recorded, the more reliable the systems become at detection of unsafe situations. However, the number of instances of unsafe situations is infinite; therefore enumerating, defining, and training, and calibrating all potentially unsafe situations is not a practical approach.

SUMMARY

In one aspect, the present disclosure relates to a vehicular warning system. The vehicular warning system includes a plurality of input devices. A computing unit is electrically coupled to the input system. The computing unit includes an input preprocessing unit and an early warning processing unit. The computing unit is electrically coupled to at least one vehicle control and communication device. The input preprocessing classifies signals received from the plurality of input devices into Vehicle information, Roadway information, Traffic information, and eXogenous information ("VRT-X") data structure. The early warning processing unit observes the VRT-X signal provided by the input preprocessing unit corresponding to an environment surrounding a vehicle, predicts future changes in the environment over a dynamically-configured range, and determines signal properties in both time and frequency domain over a moving window. Based on defined early warning classification rules, the computing unit assigns a threat level to the VRT-X signal corresponding to the environment surrounding the vehicle. Responsive to the threat level being above a threshold, the computing unit interacts with the at least one vehicle control and communication device to provide early-warning risk-mitigation control.

In another aspect, the present disclosure relates to a method of providing warning of unsafe driving conditions to a vehicle driver. The method includes observing, with a plurality of input devices, an environment surrounding a vehicle. The input preprocessing unit classifies signals received from the plurality of input devices into Vehicle information, Roadway information, Traffic information, and eXogenous information ("VRT-X") data structure. An early warning processing unit observes the VRT-X signal provided by the input preprocessing unit corresponding to the environment surrounding the vehicle, predicts future changes in the environment over the dynamically configured range, and determines signal properties in both time and frequency domain over a moving window. Responsive to defined early warning classification rules, the computing unit assigns a threat level to the VRT-X signal corresponding to the environment surrounding the vehicle. Responsive to the threat level being above a threshold, the computing unit interfaces with at least one vehicle control and communication device to alert the driver to mitigate a risk.

In another aspect, the present disclosure relates to a method of communicating a driving environment and conditions data to other connected vehicles, transportation infrastructure communication units, and traffic management centers ("TMC"). The method includes observing, with a plurality of input devices, an environment surrounding a vehicle. The input preprocessing unit classifies signals received from the plurality of input devices into Vehicle information, Roadway information, Traffic information, and eXogenous information ("VRT-X") data structure, while an on-board wireless communication unit such as, for example, DSRC, 5G, or LTE transmits the compact VRT-X signal to other connected vehicles and wireless communication stations within range.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
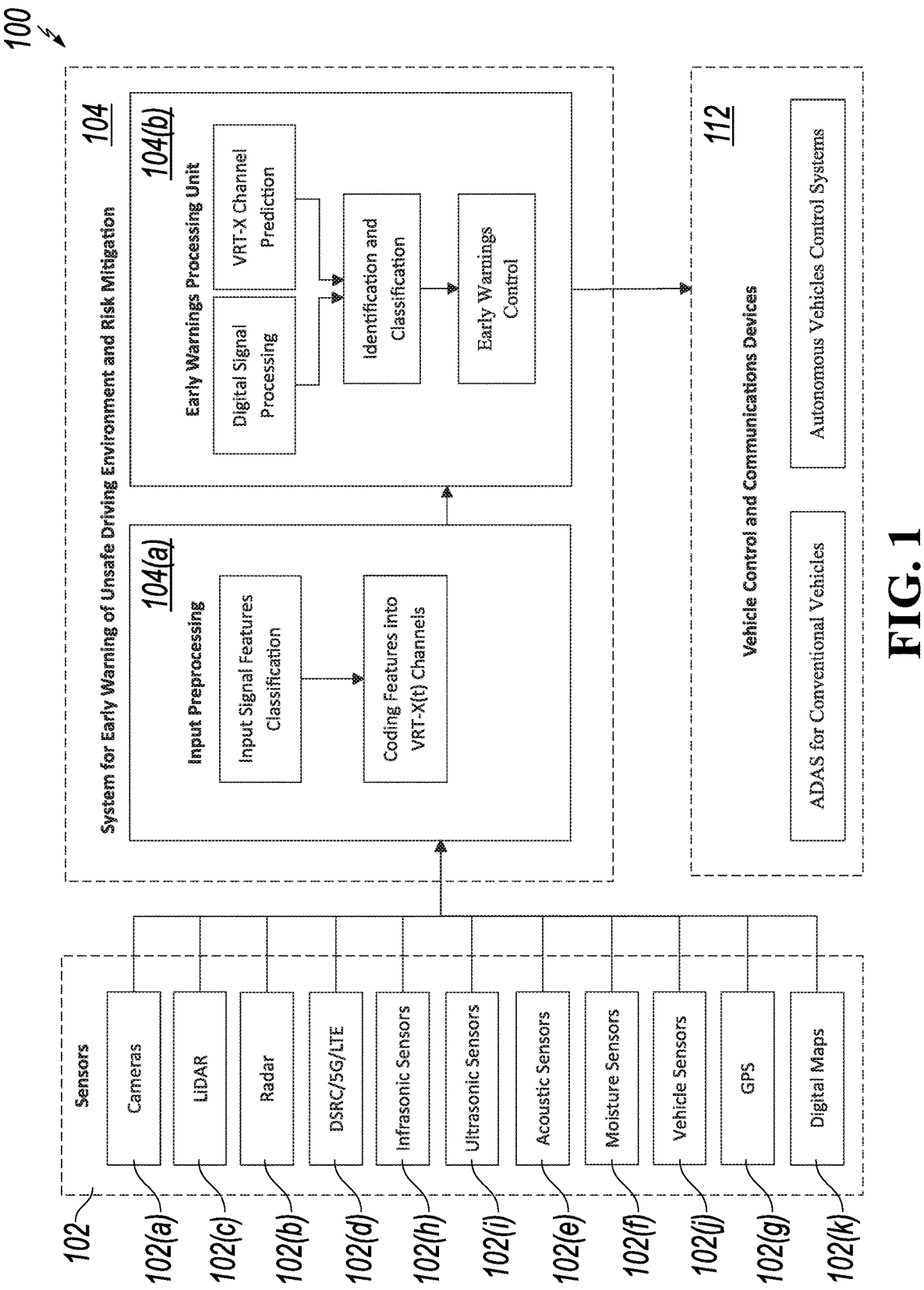
FIG. 1 is a schematic diagram of exemplary vehicle-based computing systems for providing early warnings according to an exemplary embodiment.

Various embodiments will now be described in more details with reference to the accompanying drawings. The disclosure may, however, be embodied in many different forms and should not be construed as limited to the embodiments set forth herein.

This disclosure aims to solve the following technical problem for effective and safe control of conventional, connected, and autonomous vehicles—predict unsafe driving environment and conditions and provide proactive risk-mitigation control actions. This function is important for timely adjustment of future speed and vehicle trajectories based on upcoming roadway geometry, traffic conditions, vehicle responses, and other unspecified hazards that may develop. More specifically, instances where this technical problem occurs include, but are not limited to, designs of the following vehicular systems: a) system for integrated control of vehicle speed and trajectory; b) systems for autonomous vehicle disengagement management; c) systems for communication between connected vehicles and/or transportation infrastructure in real time; d) system for detection of unresponsive vehicle controls including distracted driving; e) system for changing lanes/merging and/or passing slow vehicles on two or multiple-lane roadways; and f) other advanced-driving assistance systems such as adaptive cruise control and forward collision-warning system where early perception of unsafe driving environment and conditions allows for proactive risk-mitigation control.

Current vehicle-control methodologies are based on a narrow view of the driving environment focusing on the assembly of movable objects and curvature elements within the planned vehicle trajectory. This viewpoint is limiting as it allows for only reactive control to a perceived environment. For example, adaptive cruise controllers may adjust vehicle speed based on a rapid deceleration of an approaching vehicle while continuously maintaining minimum vehicle-to-vehicle distance. While these systems are credited with improved highway safety, they are also associated with potentially dangerous flaws. For example, in a situation when a vehicle in front of the "controlled vehicle" turns right into a street or a driveway, the response of the adaptive cruise control is often an adjustment in speed (i.e. hard braking) to maintain a specified vehicle-to-vehicle distance. This exposes the controlled vehicle to the risk of a backend collision even though the controlled vehicle was not at risk of crashing into the right-turning vehicle. In fact, reactive controllers do not anticipate future changes in the movements of objects.

To address this issue, some autonomous vehicle controllers can predict changes in monitored object trajectories for well-defined routinely-observed instances of unsafe situations, but fail to provide more generalized prediction of unsafe driving environment and conditions. The fundamental problem that this disclosure addresses is the lack of methods and tools that can be used to predict potentially unsafe situations leading to accidents and crashes using only general characteristics of the driving environment and conditions.

Various embodiments include several functionally-connected computing components combined to allow for modularity and scalability of input sensors as well as reduction in computational and data-transmission requirements. The disclosure uses a dynamically-configured region of interest for processing information in a driving environment. Data from this region of interest is then linked to signal processing, early warnings, and control functions. More specifically the disclosure codes sensors' data into Vehicle-Traffic-Roadway-eXogenous ("VRT-X") information channels with the intention of defining representation of driving environment and condition. This signal coding into VRT-X channels decouples computationally-intensive feature extraction tasks such as machine learning and machine vision from safety monitoring and early-warning analysis. This separation is advantageous as it allows for reduction in data requirements for downstream analysis without significant reduction in the relevant content. For example, all required information about the driving environment is coded in a compact VRT-X signal, thereby avoiding the challenge associated with storing excessive amounts of data in the forms of videos and LiDAR images for safety monitoring and prediction. An additional advantageous feature of VRT-X data structure is the capacity to integrate additional sensors' data streams without the need for recalibration. The VRT-X signal is based on features' classification that directly feeds into VRT-X information channels fully specifying the driving environment surrounding the vehicle. The sensors' input are independent of each other, thereby allowing for additivity and fusion after features are extracted. VRT-X representation is advantageous for vehicle-to-everything ("V2X") communication as it is compact compared to the size of video and other sensors' signals, and at the same time, provides more complete representation of the driving environment than simply communicating an individual vehicle's data such as, for example, speed, steering, vehicle position, and acceleration.

VRT-X signal representation is then used to predict future state of VRT-X information channels bounded by a dynamically-configured range that determines a relevant spatial region of interest and the prediction time horizon. The VRT-X signal is then processed for early detection of unsafe environments. The dynamically-configured range for defining the relevant spatial region of driving environment and prediction time horizon is advantageous as it allows setting boundaries for monitoring of the environment depending on the current vehicle state such as, for example, speed. For example, at higher speeds, the range of monitoring increases thereby allowing for monitoring of events that could impact vehicle control and vice versa. The predictive analysis is advantageous as it allows for determining a safe vehicle speed and trajectory profile that is based on elements of the driving environment that is modeled based on simulation of the behavior of safety-conscious drivers. This is further advantageous as the predictive analysis allows for stabilization of traffic-flow dynamics on the roadway thereby further improving driving safety outcomes. The early-warnings based on predicted and observed components of the VRT-X signal provide an input to the existing vehicle-control system. This is advantageous as it allows configuring of early warning risk-mitigation control actions that allow for prompt and more effective response to developing threats.

FIG. 1 is a schematic diagram of a vehicle-based computing system 100 for providing and responding to early warnings of unsafe driving environment and conditions. The vehicle-based computing system 100 is coupled with the input devices 102 such as sensors that provide not only raw data but also feature extraction of driving environment and conditions. Examples of such features include, but are not limited to vehicle detection and tracking, lane recognition, horizontal and vertical curvature detection, and sign and signal recognition. In various embodiments, computing units such as, for example a GPU and a CPU may be coupled with the input devices' 102 input to provide such feature extraction function. Other sensor data may come in the form of Vehicle-to-Vehicle ("V2V") and Infrastructure-to-Vehicle ("I2V") data, proximity sensors, on-board vehicle sensors and others. In various embodiments, the input devices 102 include a camera 102(a), a device 102(b) such as, for example, a short-range radar or a long-range radar, a LiDAR device 102(c), communication with an onboard wireless communication unit such as, for example, a DSRC/5G/LTE network 102(d), infrasonic sensors 102(h), and ultrasonic sensors 102(i). In other embodiments, the input devices 102 include acoustic sensors 102(e), surface moisture sensors 102(f), GPS 102(g), digital maps 102(k), and vehicular sensor information 102(j) such as, for example, CAN Bus and OBD II input data. In various embodiments, the input devices 102 may also include an RFID reader, a modem to collect data transmitted from smart infrastructure such as, for example, road signs or signals. The input devices 102 are electrically coupled to a computing unit 104. In various embodiments, the input devices 102 are coupled to the computing unit 104 via a wired or wireless connection. The computing unit 104 includes an input preprocessing unit 104(a) and an early-warning processing unit 104(b). The input pre-processing unit 104(a) classifies detected features of the environment into a VRT-X signal. In various embodiments, the VRT-X signal includes feature extractions from the respective signals of the input devices 102 such as, for example, lane detection, sign detection, vehicle detection, and others. The early-warning processing unit 104(b) processes the VRT-X signal, identifies threat levels, and provides corresponding risk-mitigation control actions. The computing unit 104 is coupled with control and communication devices 112 required for Advanced Driving Assistance Systems ("ADAS") and controllers for fully autonomous vehicles.

The vehicle-based computing system 100 acts as an interface between typically-available input and output units in vehicles. Referring again to FIG. 1, input data is first classified and coded into information channels defined around three elements: a) "controlled" vehicle data, or V; this includes but is not limited to the current GPS location, speed, and powertrain parameters, as well as other important information relevant to defining an internal state of the system; b) roadway's geometric, functional, and structural features including, but not limited to, traffic-control units and signals, or R; this includes but is not limited to the data from environment-perception sensors such as, for example, cameras, LiDAR units, moisture and acoustic sensors, as well as digital maps; c) nearby traffic features such as positions and speed of traffic participants, or T; this includes but is not limited to the data such as cameras of various forms such as long-range and thermal cameras as well as different vehicular locations such as front, side or back-facing cameras, long-range radar unit, LiDAR, ultrasonic and acoustic sensors, and others; and d) unspecified exogenous factors such as movable and unmovable objects, weather conditions, and other objects that may represent hazard to driving, or X; this includes real-time processing of raw data such as, for example, images and sounds.

Once the VRT-X signal of driving environment is coded into information channels, the processing unit 104 is activated to: a) provide prediction of the vehicle's driving parameters that are required to maintain safety with the respect to the current and future traffic conditions, roadway conditions, and other exogenous factors; and b) determine original and updated signal properties over a defined historical state i.e. moving window ("MW"). The vehicle-based computing system 100 next identifies and classifies the potential threats based on the original and updated signal properties. Finally, based on this hazard information, the vehicle-based computing system 100 provides control action(s) based on early warnings via the control and communication devices 112.

In various embodiments, the control and communication devices 112 could include a speaker that emits an auditory alert to a driver or a visual indicator that provides a visual alert to a driver. In other embodiments, the control and communication devices 112 may be integrated with the vehicular speed and direction controls thereby allowing the control and communication devices 112 to take specific action to ensure the safety of a vehicle and its occupants such as, for example, adjusting course or applying the brakes. In various embodiments, the input devices 102, the computing unit 104, and the control and communication devices 112 are integral with a vehicle. In other embodiments, the input devices 102, the computing unit 104, and the control and communication devices 112 may be may be stand-alone components that are utilized in conjunction with a vehicle. In still other embodiments, the input devices 102, the computing unit 104, and the control and communication devices 112 are integrated in a single device such as, for example, a tablet computer or a smartphone. Although the vehicular-based computing system 100 is described herein for purposes of illustration as being utilized in conjunction with an automobile, in other embodiments, vehicular-control systems utilizing principles of the invention could be utilized with any type of human-operated or autonomous vehicle such as, for example, motorcycles, bicycles, or any other vehicle as dictated by design requirements.

Figure 2:
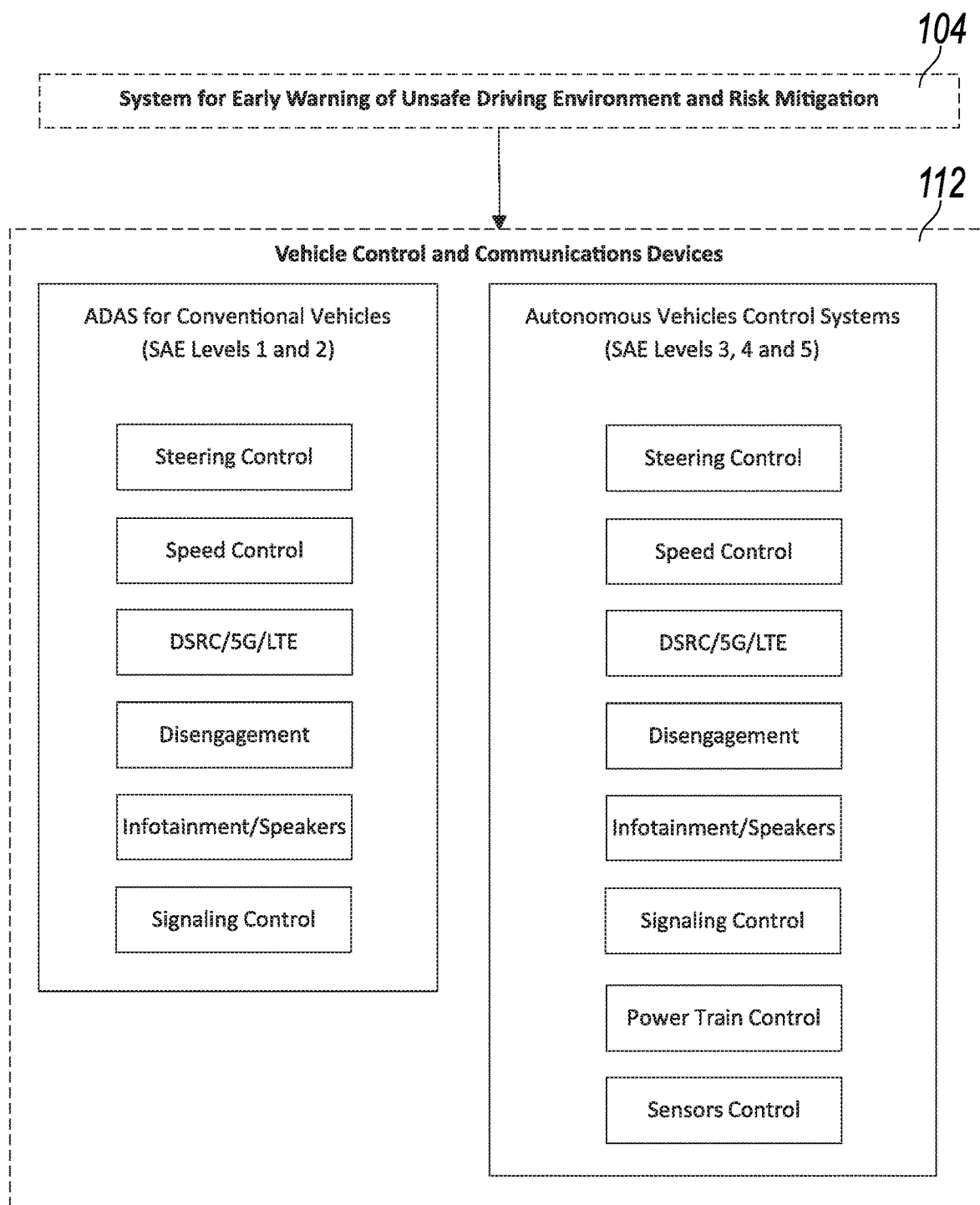
FIG. 2 is a schematic diagram of exemplary vehicle control and communication systems using output from the vehicle-based computing systems for providing early warnings.

FIG. 2 is a schematic diagram of the control and communications devices 112 that use the output of the computing unit 104. In various embodiments, vehicle-based computing system 100 is coupled with vehicle control systems. For vehicles designed with Society of Automotive Engineers ("SAE") level 1 and level 2 technologies the vehicle-based computing system's 100 output is coupled with, for example, steering control, speed control, communication with an onboard wireless communication unit such as, for example, a DSRC/5G/LTE network, disengagement system, infotainment including image, video, and speakers control units, as well as vehicle signaling devices such as blinkers, high beams front lights, and other. For vehicles designed with SAE level 3, 4 and 5 technologies the system's output is coupled with additional control systems such powertrain and sensor control.

Figure 3A:
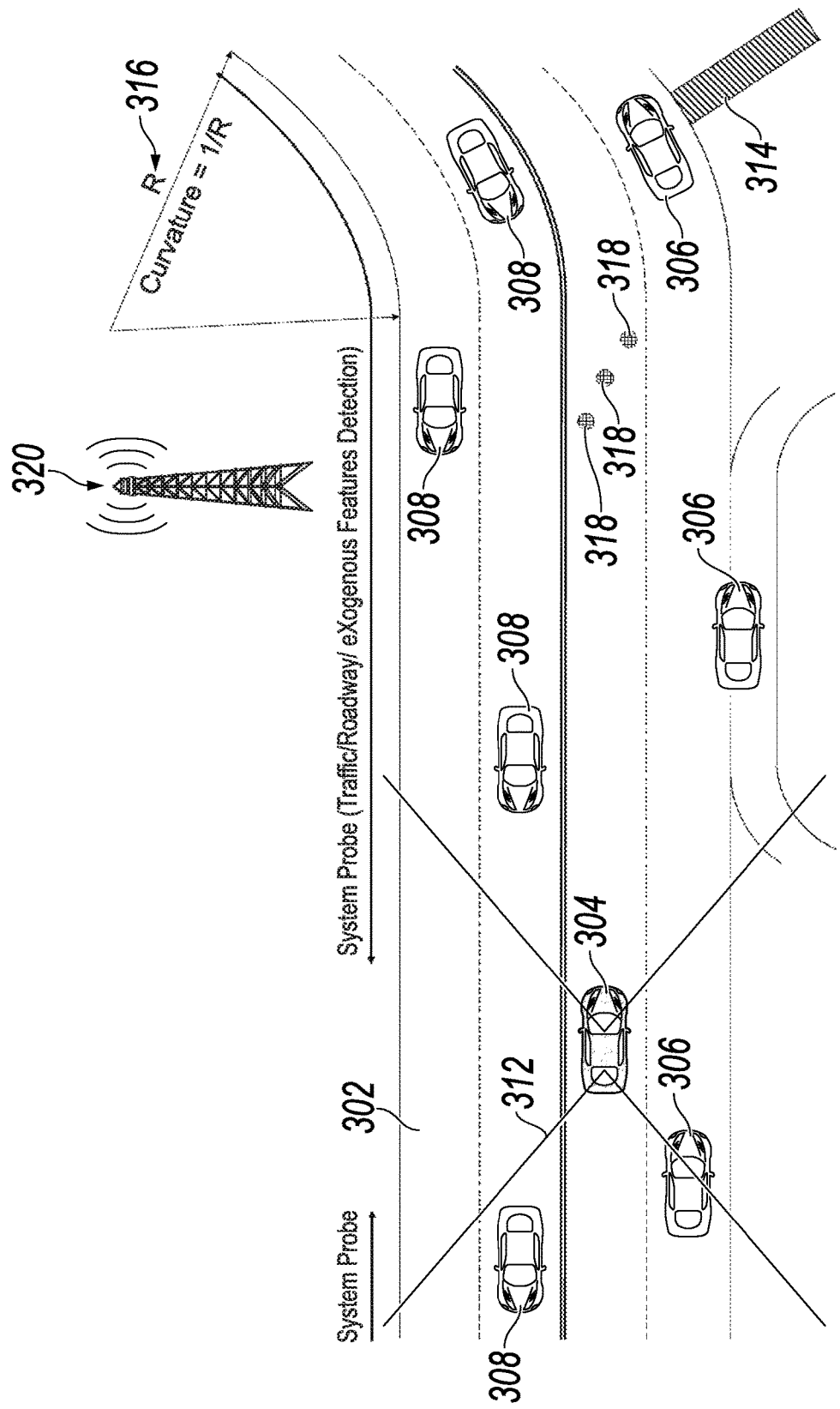
FIG. 3A is an overhead diagram of a roadway illustrating the dynamically configured Vehicle-Traffic-Roadway-eXogenous ("VRT-X") data structure in use.

FIG. 3A is an overhead diagram of a roadway 302 illustrating the exemplary VRT-X data information encoding and vehicle-based computing system 100 in use. During operation, an equipped vehicle 304 is present on the roadway 302 along with at least one surrounding vehicle 306. Vehicle 308 is driving the opposite direction and may or may not be present. The input devices 102 observe a region 310 ahead of the equipped vehicle 304 and a region 312 behind the equipped vehicle 304. In addition to the vehicles 306 and 308, the environment may also contain various roadway geometry features, including driveway 314 and curvature 316, and fixed objects 318 (e.g., debris or traffic cones). The input devices 102 receive information from sensors and from the onboard wireless communication unit such as, for example, DSRC/5G/LTE communications 320 and feeds into the preprocessing unit 104(a) to be encoded into the VRT-X signal.

Figure 3B:
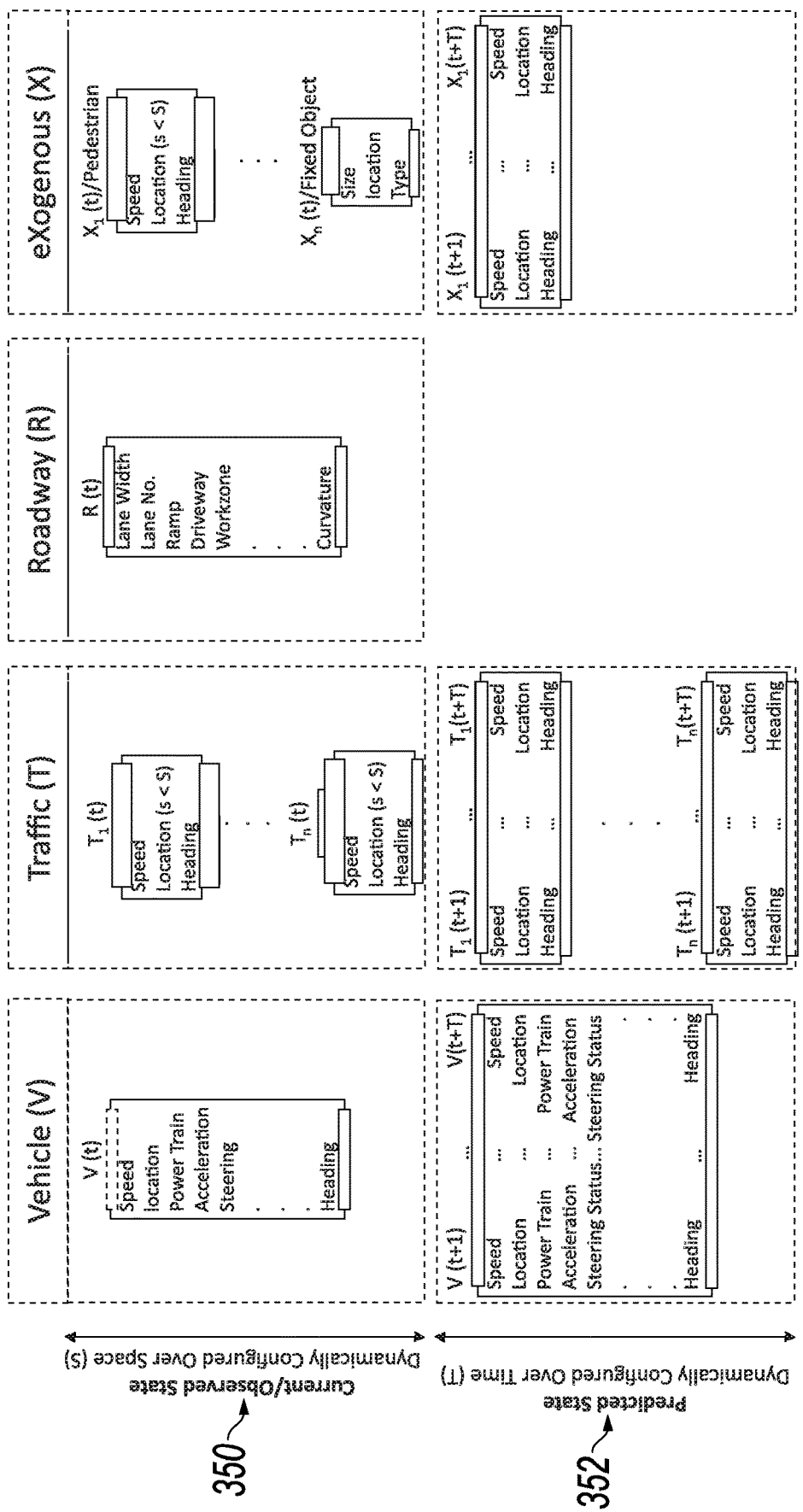
FIG. 3B is schematic diagram of the input preprocessing unit flow diagrams for encoding pre-processed inputs into VRT-X channels.

FIG. 3B is the diagram of a VRT-X signal structure. The diagram shows the current state 350 of the vehicle-based computing system 100 and predicted state 352 over a dynamically-configured range (in time and space). For example, this range can be defined as a distance if the vehicle continues with the current speed for, for example, the next approximately 5 to approximately 11 seconds. This is advantageous as threats and factors that require adjustment of speed and trajectory and are on longer distances than that mentioned above do not require adjustment of driving parameters. The current vehicle state 350 includes, for example, information on vehicle dynamics and driving related information (including but not limited to speed, location, power-train status, acceleration, steering, heading). The same information is predicted for the vehicle during the entire dynamically-configured prediction range. The current traffic state includes, for example, location, speed, and heading of all the vehicles on the roadway that are detected within the dynamically-configured range by input devices 102 and/or can communicated with the vehicle through a cellular network such as, for example, a DSRC/5G/LTE network 320. The predicted state 352 includes a prediction of the movement of all vehicles during the dynamically-configured range including the movement of the vehicle itself. The current roadway state includes the information on geometry and roadway surface within the distance that the vehicle can reach during the dynamically-configured prediction range. Therefore, no prediction is required for the roadway state. For example, roadway characteristics within the dynamically-configured range are assembled using feature extraction data from sensors such as, for example, lane marking geometry, as well as data sources that can project roadway characteristics beyond the line of vision using, for example, GPS positioning and digital maps. The current exogenous state includes, for example, the location, speed, and heading of moving objects and size, location, and type of stationary objects. The predicted state includes, for example, the location, speed, and heading of the moving objects during the prediction horizon. Similar to the roadway state, stationary objects do not require any prediction.

Figure 3C:
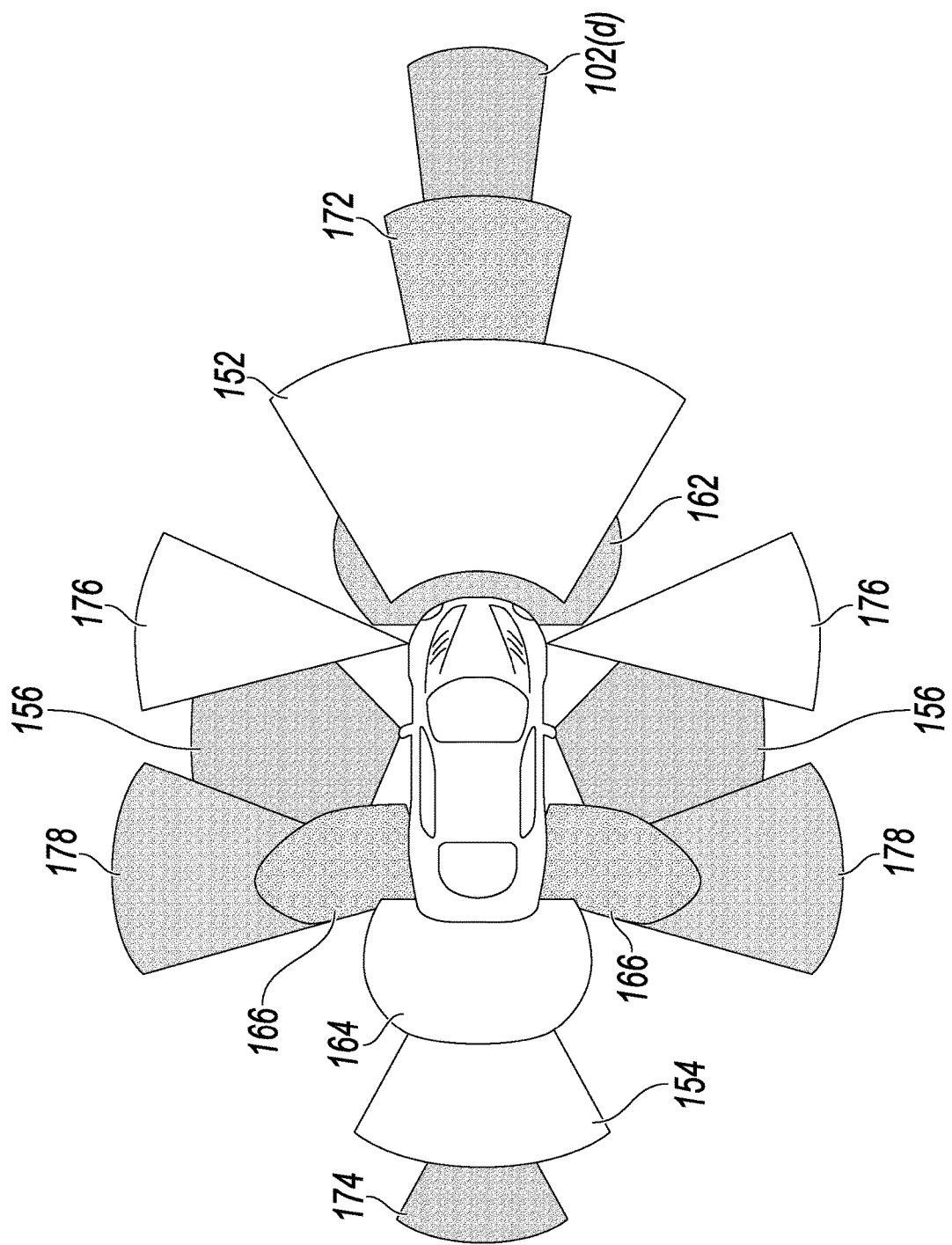
FIG. 3C is a schematic diagram illustrating functionality of exemplary input devices.

FIG. 3C is a schematic diagram illustrating functionality of the input devices 102. The camera 102(a) has a forward field of view 152, a rear field of view 154, and side field of view 156. In a typical embodiment, the forward field of view 152 of the camera 102(a) observes if the equipped vehicle 304 (shown in FIG. 3A) is traveling within a lane or if the equipped vehicle 304 is veering out of the lane. In various embodiments, the forward field of view 152 observes roadway curvature and traffic signs such as, for example, curvature of lane markings and speed-limit signs. In various embodiments, the input preprocessing unit 104(a) may include image recognition capability thereby allowing the vehicular-based computing system 100 to extract features such as interpreting roadway curvature and traffic signs. In a typical embodiment, the rear field of view 154 and the side field of view 156 provide views of the environment surrounding the vehicle. In a typical embodiment, the camera 102(a) includes multiple cameras mounted, for example, on the vehicular dash board, the side rear-view mirrors, and the license plate so as to provide the forward field of view 152, the rear field of view 154, and the side field of view 156.

Still referring to FIG. 3C, the radar 102(b) has a short-range forward field of view 162, a short-range rear field of view 164, and a blind spot field of view 166. In a typical embodiment, the short-range radar 102(b) observes vehicles in close proximity to the equipped vehicle 204. For example, the short-range forward field of view 162 observes traffic crossing ahead of the equipped vehicle 304. The short-range rear field of view 164 observes circumstances that might lead to rear collisions such as, for example, a vehicle closely following the equipped vehicle 304. The blind-spot field of view 166 observes vehicles or other objects present in the blind spot of the equipped vehicle 304.

Still referring to FIG. 3C, the LiDAR device 102(c) has a forward field of view 172, a rear field of view 174, a front-side field of view 176, and a rear-side field of view 178. In a typical embodiment, the front field of view 172, the rear field of view 174, the front-side field of view 176, and the rear-side field of view 178 of the LiDAR device 102(c) provide mapping of the environment surrounding the equipped vehicle 304. For example, the LiDAR device 102(c) may, in various embodiments, observe roadway conditions, terrain, and presence of other objects and vehicles.

Still referring to FIG. 3C, the radar 102(b) also observes a long-range region forward of the equipped vehicle. In a typical embodiment, the radar 102(b) observes presence of pedestrians or situations that may require emergency braking or collision avoidance such as, for example, sudden braking of vehicles ahead of the equipped vehicle 304.

Figure 4:
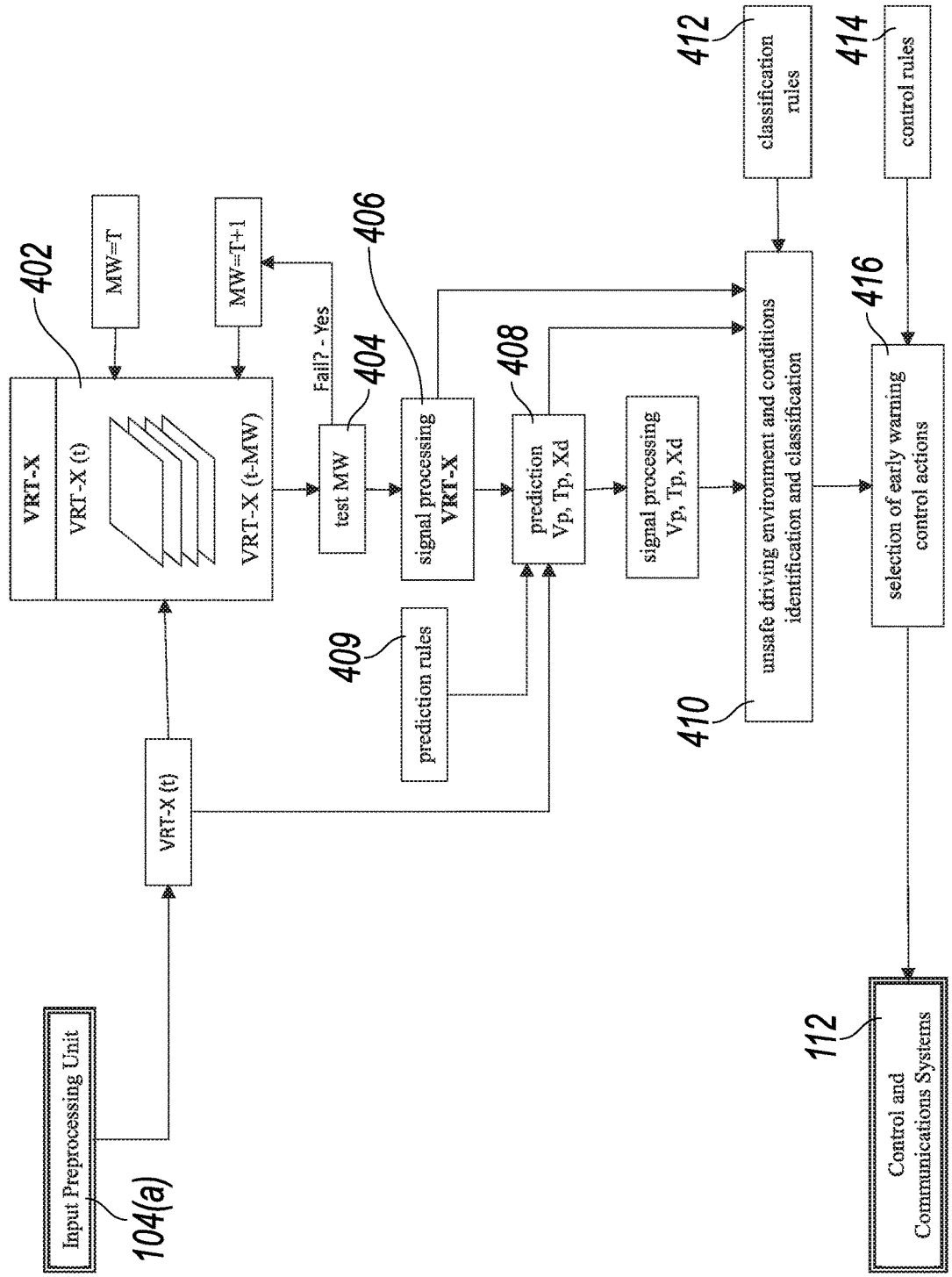
FIG. 4 is a schematic diagram of an exemplary computing unit.

FIG. 4 is a schematic flow diagram of operations required to process initial VRT signals coming from the input pre-processing unit to the control and communications systems. In addition to dynamically-configured prediction range this disclosure introduces moving window ("MW") to record evolution of VRT-X for signal processing. The vector of original VRT-X channels for the initially-set moving window MW=T is assembled from the input data at step 402. This vector is then tested at step 404 to determine if the MW is of sufficient length to determine signs of changes in the system's state and critical transitioning. Once appropriate MW length is determined, the VRT-X signal vector is processed at step 406 to determine general signal properties. This includes, but not limited to, variance, skewness, kurtosis, autocorrelation, and spectrograms. The signal properties together with original VRT-X signal are used to determine predictions Vp, Tp, and Xp at step 408. This is done based on a set of rules 409 that include, but are not limited to, vehicle following model, vehicle dynamics model, traffic flow model, and speed-roadway characteristics simulation model. Step 410 determines the unsafe driving environment and conditions based on all available information about VRT-X including signal properties for original inputs as well as calculated predictions Vp, Tp, and Xp. Classification rules 412 are used to support this process. Finally, once the potentially unsafe conditions are detected, control rules 414 set risk-mitigation control actions that are communicated to the vehicle's control and communications systems at step 416. The risk mitigation actions are then communicated to the control and communications systems 112.

Figure 5:
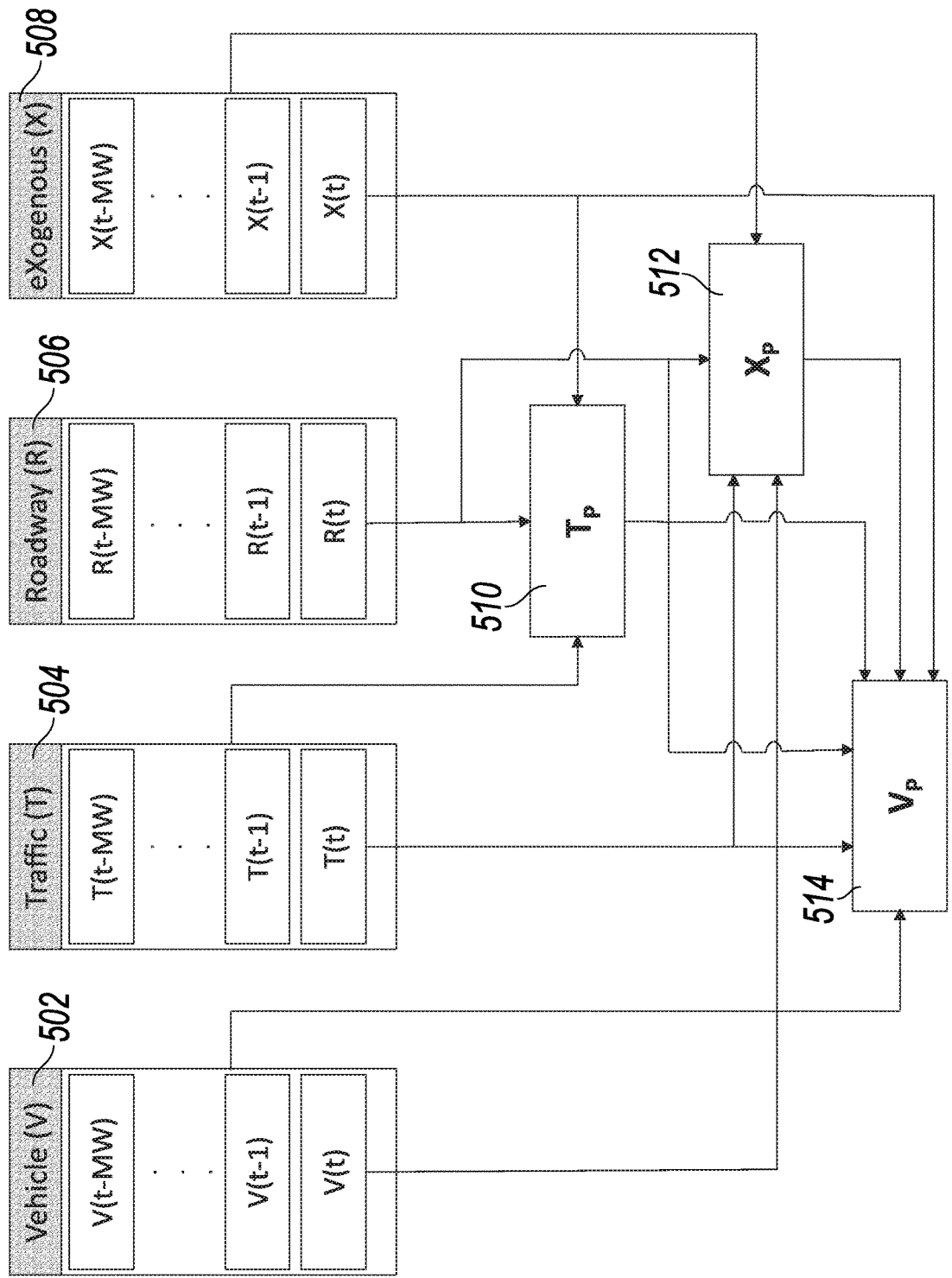
FIG. 5 is a schematic diagram of exemplary computing unit flow diagrams for developing VRT-X prediction.

FIG. 5 is the schematic of the utilized information for predicting vehicle, traffic, and exogenous factors during the prediction horizon. The process utilizes information from vehicle 502, traffic 504, roadway 506, and exogenous factors 508 derived over MW (referred to as historical state here). For traffic prediction 510, the current roadway and exogenous states are used along with the current and historical traffic states. For exogenous prediction 512, the current vehicle, traffic, and roadway along with the current and historical exogenous states are used. For vehicle prediction 514, the current, predicted, and historical traffic and exogenous states along with the current vehicle and traffic states are used.

Figure 6:
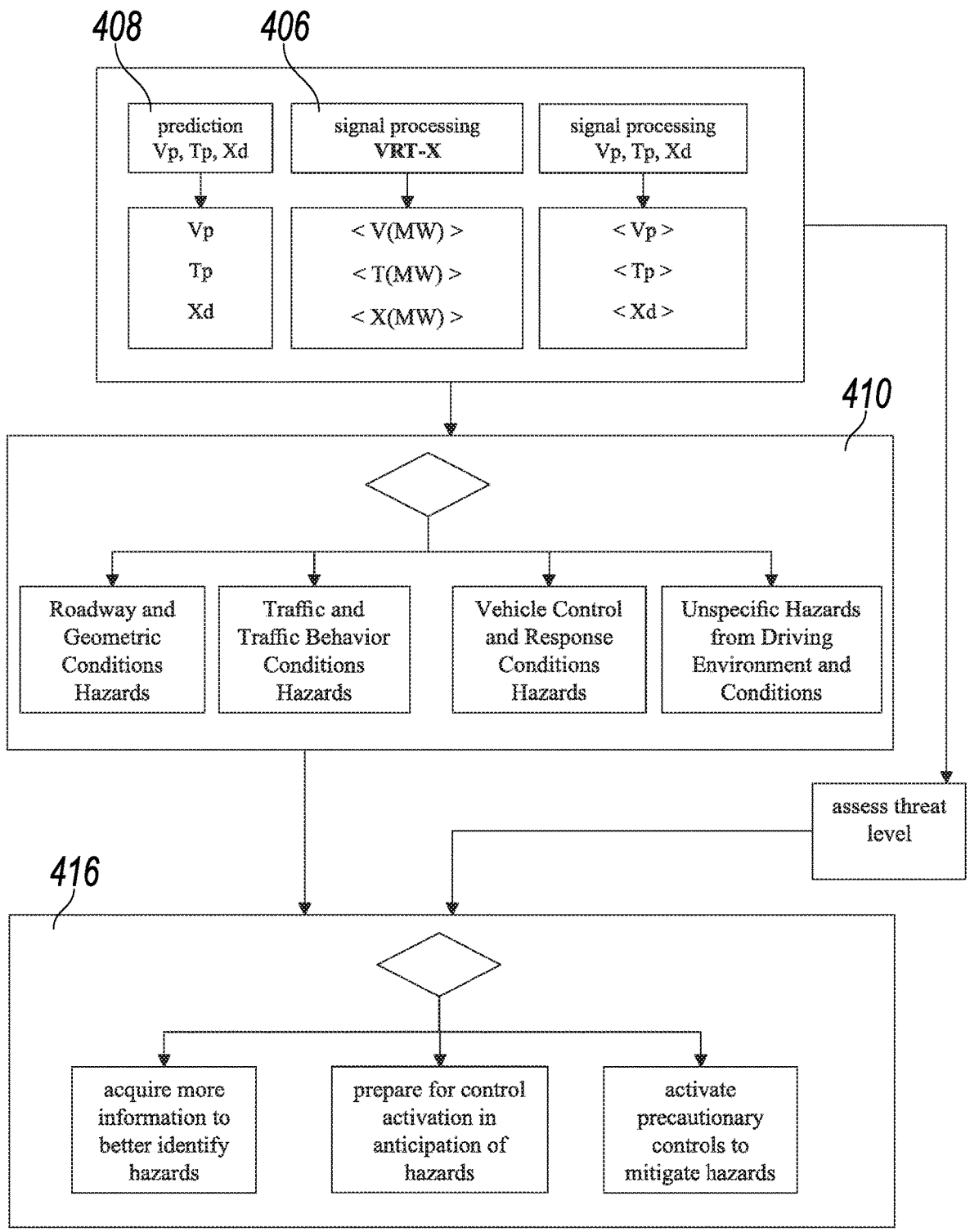
FIG. 6 is a schematic diagram of exemplary computing unit flow diagrams for classifying threats and providing early-warning risk-mitigation control actions.

FIG. 6 provides a more detailed explanation of how VRT-X signal properties 406 and predicted values 408 are used to identify unsafe conditions and how such information is used to determine a risk-mitigation control action that will be then communicated to control and communications systems 112. The updated VRT-X signal and its signal properties indicated by < > represent input to this process. This disclosure considers identification and classification of four broadly-defined categories of conditions that can result in an unsafe driving environment 410. Roadway and geometric condition hazards relate to a significant difference between the current vehicle driving controls (V) and the future state in which they need to be given upcoming roadway conditions within dynamically-configured range. Traffic behavior condition hazards relate to the state of the surrounding traffic participants (Tp, <T(MW)>, <Tp>) in conjunction with the upcoming roadway geometric, functional, and structural characteristics and the current and anticipated i.e. predicted position of objects within dynamically defined region of interest. Vehicle control and response condition hazards relate to the responsiveness of the vehicle controls to previous prediction values. As such, this hazard category addresses situations in which the hazards originate not from the driving environment, but from the system itself, i.e. the vehicle. Unspecific threats from the driving environment and conditions represent a broadly-defined category where different endogenous and exogenous factors can result in an accident. This category is characterized with signal properties of VRT-X information channels.

For each of the categories, the process defined in FIG. 6 assigns the threat level and early warning risk-mitigation control action 416. In general, based on level of emergency, the controller can select one or more of the listed actions: a) acquire more information using sensors and other data acquisition methods to provide better understanding of the condition; for example, the system could require activation of additional camera sensors to validate object movement; b) prepare for activating control in anticipation of threats; for example, the system could require preloading powertrain for rapid response; or c) activate precautionary controls to prepare for advantageous driving condition if the threat materializes; for example, the system could require reduction of speed to accommodate changing roadway conditions such as geometry, or change the trajectory to be in advantageous position when navigating curves without transition curve elements. Additionally, the system transmit the VRT-X signal to other connected vehicles and a connected transportation infrastructure.

Although various embodiments of the method and system of the present disclosure have been illustrated in the accompanying Drawings and described in the foregoing Specification, it will be understood that the disclosure is not limited to the embodiments disclosed, but is capable of numerous rearrangements, modifications, and substitutions without departing from the spirit and scope of the disclosure as set forth herein. It is intended that the Specification and examples be considered as illustrative only.

What is claimed is:

1. A vehicular warning system comprising:
   a plurality of input devices;
   a computing unit electrically coupled to the plurality of input devices, the computing unit comprising an input preprocessing unit and an early warning processing unit;
   wherein the computing unit is electrically coupled to at least one vehicle control and communication device;
   wherein the input preprocessing codes signals and extracted features received from the plurality of input devices into channels corresponding to vehicle information, roadway information, traffic information, and exogenous information ("VRT-X") data structure, thereby decoupling feature-extraction tasks from safety monitoring and early-warning analysis;
   wherein the early warning processing unit observes the VRT-X signal provided by the input preprocessing unit corresponding to an environment surrounding a vehicle, predicts changes in the environment for a dynamically-configured range, and determines signal properties over a defined moving window;
   wherein, responsive to the VRT-X signal, predicted values, and the signal properties, the computing unit assigns a threat level to signals corresponding to the environment surrounding the vehicle; and
   wherein, responsive to the threat level being above a threshold, the computing unit interacts with the at least one vehicle control and communication device to provide early warning risk mitigation control actions.

2. The vehicular warning system of claim 1, wherein the early warning risk mitigation control action directs the vehicle to change at least one of trajectory and speed to avoid an unsafe condition.

3. The vehicular warning system of claim 1, wherein the plurality of input devices comprises a camera.

4. The vehicular warning system of claim 1, wherein the plurality of input devices comprises a radar.

5. The vehicular warning system of claim 1, wherein the plurality of input devices comprises a LiDAR device.

6. The vehicular warning system of claim 1, wherein the plurality of input devices comprises at least one of a GPS system and a digital map.

7. The vehicular warning system of claim 1, wherein the at least one vehicle control and communication device comprises steering control.

8. The vehicular warning system of claim 1, wherein the at least one vehicle control and communication device comprises speed control.

9. The vehicular warning system of claim 1, wherein the at least one vehicle control and communication device comprises signaling control.

10. The vehicular warning system of claim 1, wherein the at least one vehicle control and communication device comprises power train control.

11. A method of providing warning of unsafe conditions to at least one of an advanced driving assistance system, an autonomous vehicle control system, and a vehicle driver, the method comprising:
    observing, with a plurality of input devices, an environment surrounding a vehicle;
    transmitting, from the plurality of input devices, a signal and extracted features to a computing unit, the signal corresponding to the environment surrounding the vehicle;
    coding, via the computing unit the signal into channels corresponding to at least one of vehicle information, roadway information, traffic information, and exogenous information ("VRT-X") data structure thereby decoupling feature-extraction tasks from safety monitoring and early-warning analysis;
    predicting, via the computing unit, changes in the VRT-X signal over a dynamically-configured range;
    processing, via the computing unit, the VRT-X signal over a moving window;
    responsive to a determination of VRT-X, prediction, and signal properties, assigning a threat level to the signal; and responsive to the threat level being above a threshold, interfacing with at least one vehicle control and communication device to take risk mitigation control action.

12. The method of claim 11, wherein the environment comprises at least one of position, velocity, and trajectory of surrounding vehicles and other objects with the dynamically-configured range.

13. The method of claim 11, wherein the environment comprises roadway geometric, structural, and functional characteristics.

14. The method of claim 11, wherein the environment comprises weather conditions.

15. A method for communicating a vehicular driving environment and conditions to other connected vehicles and surrounding connected infrastructure, the method comprising:
  observing, via a plurality of input devices, an environment surrounding a vehicle;
  transmitting, from the plurality of input devices, a signal and extracted features to a computing unit, the signal corresponding to the environment surrounding the vehicle;
  coding, via the computing unit, the signal into channels corresponding at least one of vehicle information, roadway information, traffic information, and exogenous information ("VRT-X") data structure thereby decoupling feature-extraction tasks from safety monitoring and early-warning analysis;
  predicting, via the computing unit, changes in the VRT-X signal over a dynamically-configured range; and
  responsive to a determination the VRT-X signal and predicted changes in VRT-X elements over the dynamically-configured range, transmitting a signal to connected vehicles and connected transportation infrastructure that are within a communication device's range.

16. The method of claim 15, wherein the communication device is an onboard wireless communication unit.

17. A method of monitoring vehicular driving environment and conditions for safe autonomous vehicle control unit disengagement, the method comprising:
  observing, via a plurality of input devices, an environment surrounding a vehicle;
  transmitting, from the plurality of input devices, a signal and extracted feature to a computing unit, the signal corresponding to the environment surrounding the vehicle;
  coding, via the computing unit, the signal into channels corresponding to at least one of vehicle information, roadway information, traffic information, and exogenous information ("VRT-X") data structure thereby decoupling feature-extraction tasks from safety monitoring and early-warning analysis;
  predicting, via the computing unit, changes in VRT-X elements over a dynamically-configured range;
  processing, via the computing unit, the VRT-X signal over a moving window;
  responsive to a determination of the VRT-X signal, prediction, and signal properties, assigning a threat level to the signal; and
  responsive to the threat level being above a threshold, interfacing with at least one vehicle control and communication device to warn a driver and disengage the autonomous vehicle control unit.

18. The method of claim 17, wherein the input device is a camera.

19. The method of claim 17, wherein the vehicle communication and control device is a speed control unit.

20. The method of claim 17, wherein the vehicle communication and control device is a signaling control unit.

* * * * *